US008794709B2

(12) United States Patent
Kennedy

(10) Patent No.: US 8,794,709 B2
(45) Date of Patent: Aug. 5, 2014

(54) CHILD RESTRAINT DEVICES FOR USE WITH SEATS

(71) Applicant: Kennedy Innovations LLC, Camas, WA (US)

(72) Inventor: Raina Kennedy, Camas, WA (US)

(73) Assignee: Kennedy Innovations LLC, Camas, WA (US)

( * ) Notice: Subject to any disclaimer, the term of this patent is extended or adjusted under 35 U.S.C. 154(b) by 0 days.

(21) Appl. No.: 13/993,246

(22) PCT Filed: Dec. 4, 2012

(86) PCT No.: PCT/US2012/067778
§ 371 (c)(1),
(2), (4) Date: Jun. 11, 2013

(87) PCT Pub. No.: WO2013/085912
PCT Pub. Date: Jun. 13, 2013

(65) Prior Publication Data
US 2014/0125110 A1    May 8, 2014

Related U.S. Application Data

(60) Provisional application No. 61/567,471, filed on Dec. 6, 2011.

(51) Int. Cl.
*A62B 35/00* (2006.01)
*B60R 22/10* (2006.01)
*B60R 22/26* (2006.01)

(52) U.S. Cl.
CPC ............... *B60R 22/10* (2013.01); *B60R 22/26* (2013.01)
USPC ............................ 297/485; 297/465; 297/467

(58) Field of Classification Search
USPC ................... 297/465, 485, 467, 466
See application file for complete search history.

(56) References Cited

U.S. PATENT DOCUMENTS 2,635,245 A * 4/1953 Nigro ..................... 297/465 X
3,099,486 A * 7/1963 Scott ........................ 297/465
(Continued)

FOREIGN PATENT DOCUMENTS

| EP | 1440853 A1 | 7/2004 |
| RU | 2426661 C2 | 7/2009 |
| RU | 107731 U1 | 8/2011 |
| WO | 2006058930 A1 | 6/2008 |

OTHER PUBLICATIONS

International Search Report and Written Opinion for International Application No. PCT/US2012/067778 mailed Mar. 28, 2013.

*Primary Examiner* — Rodney B White
(74) *Attorney, Agent, or Firm* — Sutherland Asbill & Brennan LLP

(57) ABSTRACT

A child restraint device may include, in one embodiment, a base member and a back member. The back member may be foldably attached to the base member such that the base member and the back member may be folded together. The child restraint device may also include at least one back member securing belt and at least one base member securing belt. Moreover, the child restraint device may include a restraint harness disposed between the base member and the back member. The restraint harness may include an adjustable shoulder portion attached to the back member and an adjustable lap portion attached to the base member.

9 Claims, 7 Drawing Sheets

(56) References Cited

U.S. PATENT DOCUMENTS

| | | | | |
|---|---|---|---|---|
| 3,301,594 | A | * | 1/1967 | Pukish, Jr. .................. 297/467 |
| 3,827,716 | A | * | 8/1974 | Vaughn et al. ............. 297/465 X |
| 4,226,474 | A | * | 10/1980 | Rupert et al. .............. 297/465 X |
| 4,632,425 | A | * | 12/1986 | Barratt ...................... 297/465 X |
| 4,674,800 | A | * | 6/1987 | Ensign ......................... 297/465 |
| 4,927,211 | A | * | 5/1990 | Bolcerek ...................... 297/465 |
| 5,161,258 | A | * | 11/1992 | Coltrain .................... 297/465 X |
| 5,215,354 | A | * | 6/1993 | Grene .......................... 297/485 |
| 5,429,418 | A | * | 7/1995 | Lipper et al. ................. 297/465 |
| 5,628,548 | A | * | 5/1997 | Lacoste .................... 297/465 X |
| 5,733,014 | A | * | 3/1998 | Murray ........................ 297/485 |
| 6,364,417 | B1 | * | 4/2002 | Silverman .................... 297/464 |
| 6,402,251 | B1 | * | 6/2002 | Stoll ............................. 297/485 |
| 6,547,334 | B1 | * | 4/2003 | Girardin .................. 297/485 X |
| 6,616,242 | B1 | * | 9/2003 | Stoll ............................. 297/485 |
| 6,688,701 | B1 | * | 2/2004 | Weaver ........................ 297/485 |
| 6,955,403 | B1 | * | 10/2005 | Weaver ........................ 297/485 |
| 7,021,719 | B2 | * | 4/2006 | Stoll ............................. 297/485 |
| 7,131,703 | B1 | * | 11/2006 | Sheridan et al. ............. 297/465 |
| 7,140,692 | B2 | * | 11/2006 | Stoll ............................. 297/485 |
| 7,188,899 | B1 | * | 3/2007 | McClellan-Derrickson . 297/467 X |
| 7,699,402 | B2 | * | 4/2010 | DeLellis et al. ............. 297/485 |
| 8,210,617 | B2 | * | 7/2012 | Aaron et al. ............. 297/465 X |

\* cited by examiner

CHILD RESTRAINT DEVICES FOR USE WITH SEATS

CROSS-REFERENCE TO RELATED APPLICATIONS

The present application claims priority to and the benefit of U.S. Provisional Patent Application No. 61/567,471, entitled "CHILD RESTRAINT DEVICES FOR USE WITH SEATS," filed on Dec. 6, 2011, which is hereby incorporated by reference in its entirety.

FIELD

Embodiments of the disclosure relate generally to child restraint devices and more particularly to child restraint devices for use with seats, such as aircraft seats.

BACKGROUND

In typical aircraft seats, the conventional lap belts are not ideally suited for use with toddlers and small children, who for example may easily extricate themselves despite the intentions of their accompanying parent or other caretaker. Moreover, existing seat safety structures cannot be conveniently constructed, stored, and transported to and from the aircraft seat. Accordingly, it would be desirable to provide a child restraint device for use with an aircraft seat that is easy to use, store, and transport.

SUMMARY

Some or all of the above needs and/or problems may be addressed by certain embodiments of the present disclosure. According to one embodiment, a child restraint device is provided for use with a seat, such as an aircraft seat. The seat may include a bottom portion, a back portion, and an associated seat belt assembly. The child restraint device may include a base member having a front end, a rear end, a top surface, and a bottom surface. The child restraint device may also include a back member having a top end, a bottom end, a front surface, and a rear surface. The bottom end of the back member may be foldably attached to the rear end of the base member such that the base member and the back member include a folded configuration and an unfolded configuration. The child restraint device may also include at least one back member securing belt that is attached to the back member and is configured to be fastened around the back portion of the seat. Similarly, the child restraint device may include at least one base member securing belt that is attached to the base member and is configured to be fastened around the bottom portion of the seat. Moreover, the child restraint device may include a restraint harness disposed between the top surface of the base member and the front surface of the back member. The restraint harness may include an adjustable shoulder portion attached to the back member and an adjustable lap portion attached to the base member. The adjustable shoulder portion and the adjustable lap portion may be releasably fastened together.

According to another embodiment, a child restraint device is provided for use with a seat, such as an aircraft seat. The seat may include a bottom portion, a back portion, and an associated seat belt assembly. The child restraint device may include a back member having a top end, a bottom end, a front surface, a rear surface, and an internal cavity. The child restraint device may also include at least one securing belt that is attached to the back member and is configured to be fastened around the back portion of the seat. Moreover, the child restraint device may include a restraint harness attached to the back member. The restraint harness may include an adjustable shoulder portion attached to the top end of the front surface of the back member and an adjustable lap portion attached to the bottom end of the front portion of the back member. The adjustable shoulder portion and the adjustable lap portion may be releasably fastened together.

Other embodiments, aspects, and features of the invention will become apparent to those skilled in the art from the following detailed description, the accompanying drawings, and the appended claims.

BRIEF DESCRIPTION OF THE DRAWINGS

Reference will now be made to the accompanying drawings, which are not necessarily drawn to scale.

DETAILED DESCRIPTION

Illustrative embodiments will now be described more fully hereinafter with reference to the accompanying drawings, in which some, but not all, embodiments are shown. The present disclosure may be embodied in many different forms and should not be construed as limited to the embodiments set forth herein. Like numbers refer to like elements throughout.

Devices, systems, and methods are disclosed herein for restraining a child within a seat, such as an aircraft seat. According to at least one embodiment, a child restraint device is disclosed. The child restraint device may be used in association with a seat, such as an aircraft seat having a bottom portion, a back portion, and an associated seat belt assembly. Although the following disclosure describes the child restraint device in association with an aircraft seat, it is understood that the disclosed child restraint device may be associated with a variety of types of seats, including, but not limited to, a car seat or a booster seat.

Figure 1A:
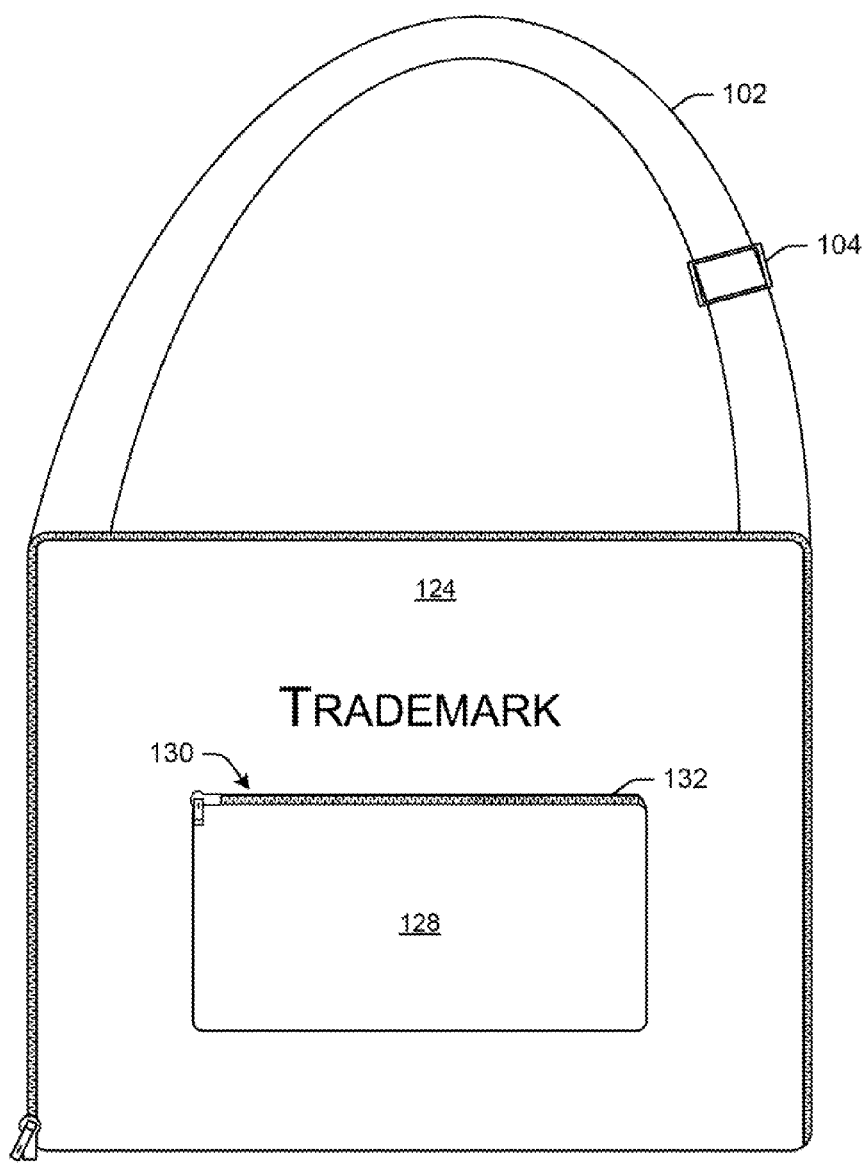
FIG. 1A schematically depicts a front view of an example embodiment of the child restraint device in the folded configuration.
Figure 1B:
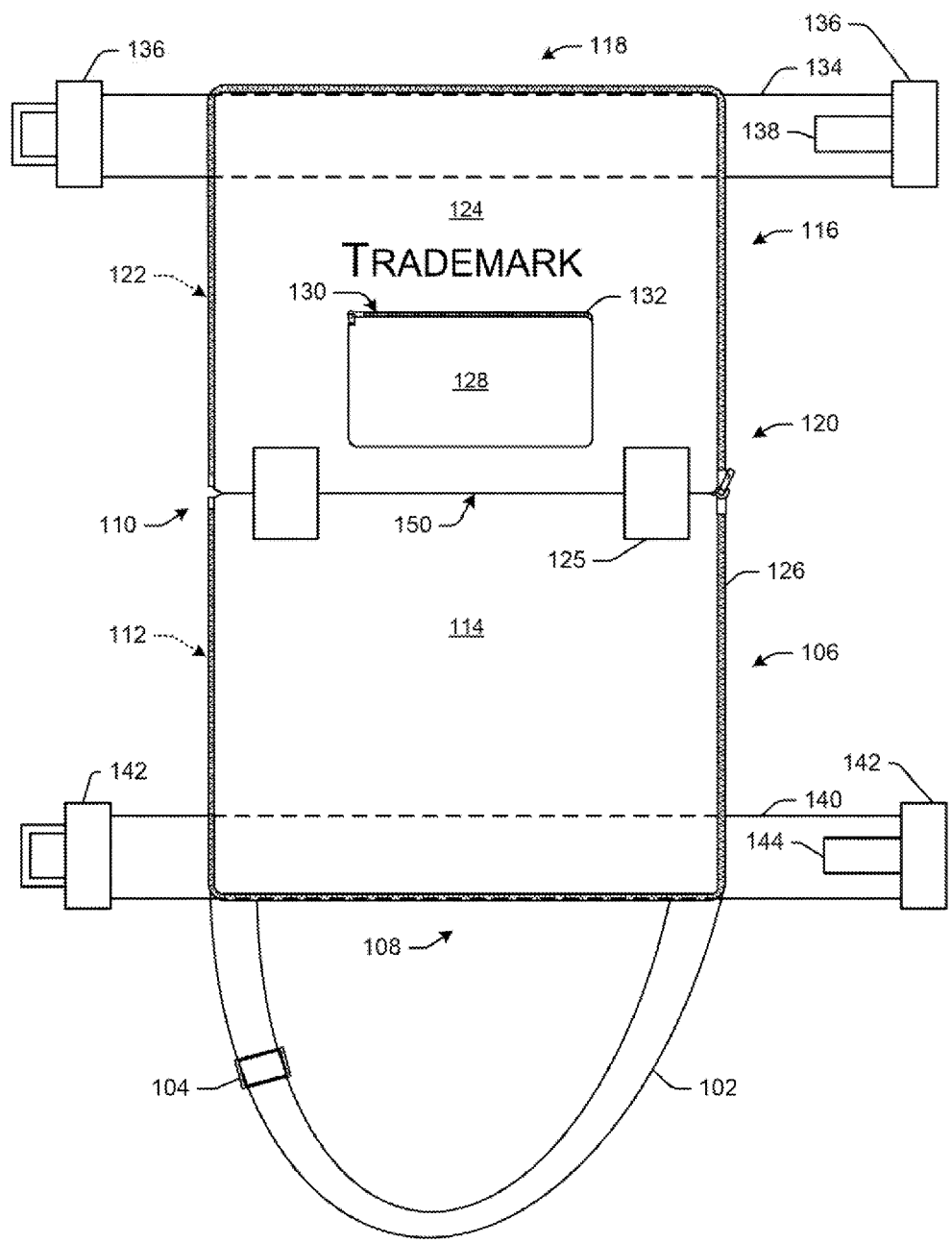
FIG. 1B schematically depicts a back view of an example embodiment of the child restraint device in the unfolded configuration.

FIG. 1A schematically depicts an example embodiment of a child restraint device 100 in the folded configuration, and FIG. 1B schematically depicts a back view of the child restraint device 100 in the unfolded configuration. In some instances, the child restraint device 100 may include an adjustable shoulder strap 102 for carrying the child restraint device when in the folded configuration. For example, the adjustable shoulder strap 102 may include a slide adjuster 104 or the like that is configured to shorten or lengthen the adjustable shoulder strap 102. In this manner, the child restraint device 100, when in the folded configuration, may be carried by the adjustable shoulder strap 102 like a satchel. In another embodiment, the child restraint device 100 may include a pair of backpack straps or the like for carrying the child restraint device 100 when in the folded configuration. In some instances, the adjustable shoulder straps and the backpack straps may be one in the same. Other configurations, components, or combinations thereof may also be used for carrying the child restraint device 100 when in the folded configuration, such as a handle or the like.

In certain embodiments, the child restraint device 100 may include a base member 106 having a front end 108, a rear end 110, a top surface 112, and a bottom surface 114. The child restraint device 100 may also include a back member 116 having a top end 118, a bottom end 120, a front surface 122, and a rear surface 124. The bottom end 120 of the back member 116 may be foldably attached to the rear end 110 of the base member 106 such that the base member 106 and the back member 116 include a folded configuration (as depicted in FIG. 1A) and an unfolded configuration (as depicted in FIG. 1B). For example, the base member 106 may be attached to the back member 116 by way of a hinge 125 or the like. Any joint that facilitates the folding of the child restraint device 100 from a folded configuration to an unfolded configuration may be used, such as a connecting strap. That is, the base member 106 may be attached to the back member 116 by any flexible or rotatable means.

When in the folded configuration, the top surface 112 of the base member 106 and the front surface 122 of the back member 116 may abut each other. The folded configuration facilitates transportation and stowage of the child restraint device 100. Conversely, when in the unfolded configuration and positioned within a seat, such as an aircraft seat, the base member 106 and the back member 116 may be generally transverse to each other.

The child restraint device 100 may include a means for securing the base member 106 and the back member 116 in the folded configuration. For example, a zipper-type mechanism may be used to secure the base member 106 and the back member 116 in the folded configuration. The zipper-type mechanism may be disposed along the periphery of the seam between the top surface 112 of the base member 106 and the front surface 122 of the back member 116 when the child restraint device 100 is in the folded configuration. That is, in some instances, in order to maintain the child restraint device 100 in the folded configuration, a zipper 126 may extend at least partially about the periphery of the base member 106 and the back member 116. In this manner, the base member 106 and the back member 116 may be zipped together such that the top surface 112 of the base member 106 abuts the front surface 122 of the back member 116. Accordingly, the base member 106 and the back member 116 may be folded together and zipped shut or unzipped and unfolded. One will appreciate, however, that other means, such as, but not limited to, a strap, a latch, a button, a hook-and-loop fastener (e.g., VELCRO®), or the like may be used to secure the base member 106 and the back member 116 in the folded configuration.

In certain embodiments, the child restraint device 100 may include a storage pouch 128 disposed on the rear surface 124 of the back member 116 and/or on the bottom surface 114 of the base member 106. For example, the storage pouch 128 may be a mesh pouch or the like comprising an opening 130. In some examples, to close the storage pouch 128, a releasable fastener system, such as a zipper 132, may extend at least partially across the opening 130 of the storage pouch 128. Other configurations, components, or combinations thereof may also be used for closing the opening 130 of the storage pouch 128, such as a strap, a latch, a button, a hook-and-loop fastener, etc. Moreover, any number of storage pouches 128 may be used. Furthermore, one or more storage pouches 128 may be disposed on the front surface 122 of the back member 116, the top surface 112 of the base member 106, and/or the bottom surface 114 of the base member 106.

As noted above, the unfolded configuration of the child restraint device 100 may be associated with an aircraft seat. That is, the bottom surface 114 of the base member 106 may be positioned against the bottom portion of the aircraft seat, and the rear surface 124 of the back member 116 may be positioned against the back portion of the aircraft seat. The child restraint device 100 may then be securely attached to the aircraft seat, as discussed in greater detail below.

In certain embodiments, the child restraint device 100 may include at least one back member securing belt 134 that is attached to the back member 116 and is adapted to be fastened around the back portion of an aircraft seat, such as a passenger seat or a commercial airline seat. In certain aspects, the at least one back member securing belt 134 may include a configuration similar to a standard aircraft seat belt. For example, the at least one back member securing belt 134 may include a buckle 136 and an adjustable strap 138 for fastening the at least one back member securing belt 134 around the back portion of the aircraft seat. In other instances, the at least one back member securing belt 134 may comprise a hook-and-loop (e.g., VELCRO®) strap. The at least one back member securing belt 134 may extend in a generally transverse direction from the rear surface 124 of the back member 116 when fastened about the back portion of the aircraft seat. In another aspect, the at least one back member securing belt 134 may be attached to the back member 116 about the top end 118 of the back member 116, although the at least one back member securing belt 134 may be attached at any location about the back member 116.

Similarly, the child restraint device 100 may include at least one base member securing belt 140 that is attached to the base member 106 and is adapted to be fastened around the bottom portion of the aircraft seat. In one aspect, the at least one base member securing belt 140 may include a configuration similar to a standard aircraft seat belt. For example, the at least one base member securing belt 140 may include a buckle 142 and an adjustable strap 144 for fastening the at least one base member securing belt around the bottom portion of the aircraft seat. In other instances, the at least one base member securing belt 140 may comprise a hook-and-loop (e.g., VELCRO®) strap. The at least one base member securing belt 140 may extend in a generally transverse direction from the bottom surface 114 of the base member 106 when fastened about the bottom portion of the aircraft seat. In another aspect, the at least one base member securing belt 140 may be attached to the base member 106 about the front end 108 of the base member 106, although the at least one base member securing belt 140 may be attached at any location about the base member 106.

Accordingly, the at least one back member securing belt 134 and the at least one base member securing belt 140 may facilitate the temporary coupling of the child restraint device 100 to the aircraft seat. That is, the at least one back member securing belt 134 and the at least one base member securing belt 140 may individually or in combination secure the child restraint device 100 to the aircraft seat. In some instances, the at least one back member securing belt 134 or the at least one base member securing belt 140 may be omitted. That is, only one securing belt may couple the child restraint device 100 to the aircraft seat.

Figure 2:
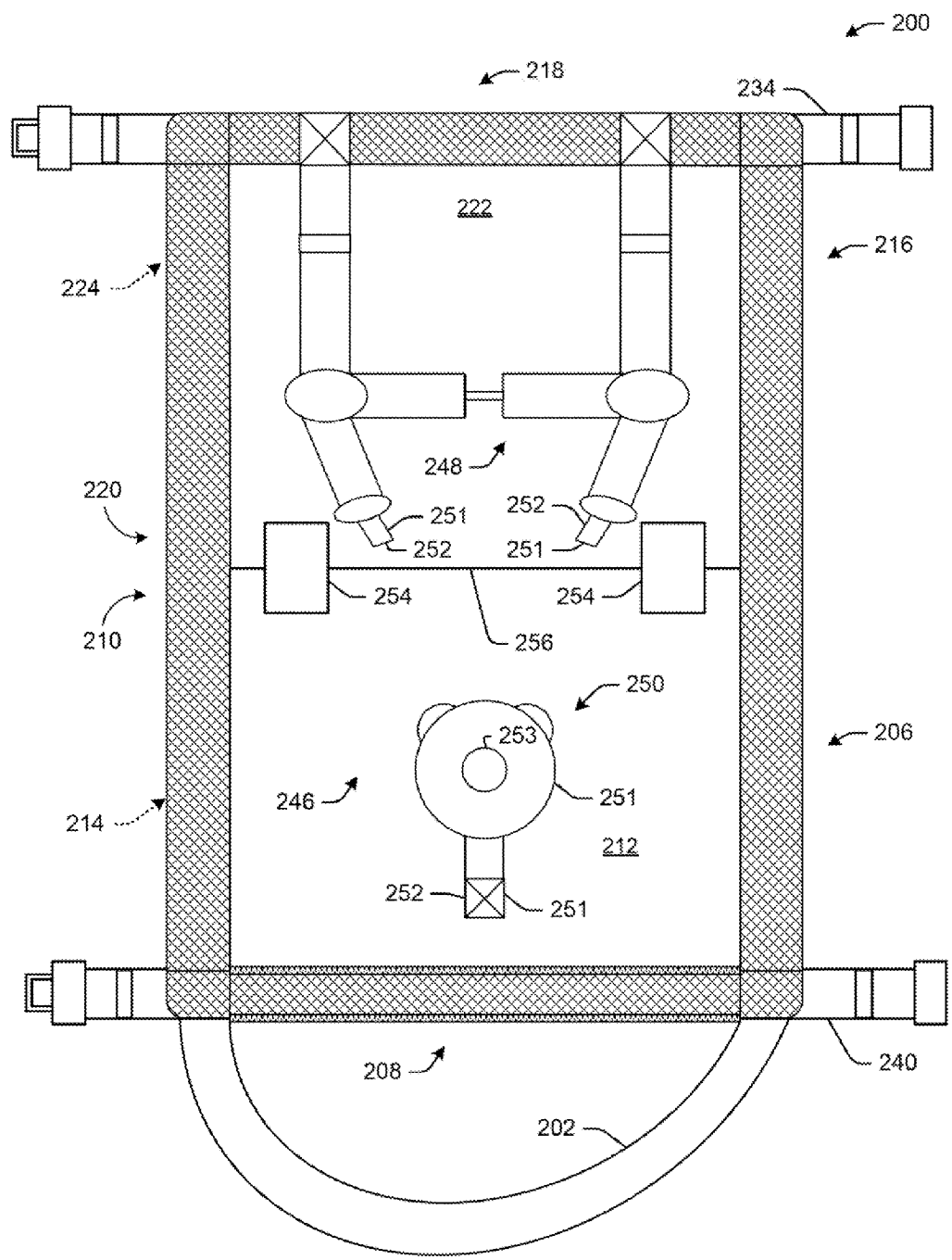
FIG. 2 schematically depicts a front view of an example embodiment of the child restraint device in the unfolded configuration.

FIG. 2 schematically depicts a front view of an example embodiment of a child restraint device 200 in the unfolded configuration. The child restraint device 200 is similar to the child restraint device 100 discussed above. For example, the child restraint device 200 may include an adjustable shoulder strap 202 for carrying the child restraint device when in the folded configuration. The child restraint device 200 may also include a base member 206 having a front end 208, a rear end 210, a top surface 212, and a bottom surface 214. In addition, the child restraint device 200 may include a back member 216 having a top end 218, a bottom end 220, a front surface 222, and a rear surface 224. The bottom end 220 of the back member 216 may be foldably attached to the rear end 210 of the base member 206 such that the base member 206 and the back member 216 include a folded configuration and an unfolded configuration as discussed above. When in the unfolded configuration and positioned within a seat, such as an aircraft seat, the base member 206 and the back member 216 may be generally transverse to each other. In certain embodiments, the child restraint device 200 may include at least one back member securing belt 234 that is attached to the back member 216 and is adapted to be fastened around the back portion of the aircraft seat. Similarly, the child restraint device 200 may include at least one base member securing belt 240 that is attached to the base member 206 and is adapted to be fastened around the bottom portion of the aircraft seat.

The child restraint device 200 may also include a restraint harness 246 disposed between the top surface 212 of the base member 206 and the front surface 222 of the back member 216. When the child restraint device 200 is in the folded configuration, the restraint harness 246 may be disposed (or sandwiched) between the top surface 212 of the base member 206 and the front surface 222 of the back member 216. When the child restraint device 200 is in the unfolded configuration, as depicted in FIG. 2, the restraint harness 246 may be used to secure a child within the child restraint device 200. For example, the restraint harness 246 may include an adjustable shoulder portion 248 attached to the back member 216 and an adjustable lap portion 250 attached to the base member 206. The adjustable shoulder portion 248 and the adjustable lap portion 250 may be releasably fastened together by any means known in the art, such as with a buckle, latch-type mechanism, or attachment loop. The adjustable shoulder portion 248 of the restraint harness 246 may be configured to go over the shoulders of a child and secure the upper torso of the child. The adjustable lap portion 250 of the restraint harness 246 may be configured to go between the legs and over the lap of a child and secure the lower torso of the child. In some instances, the restraint harness 246 may comprise an adjustable five point restraint or the like. That is, the adjustable shoulder portion 248 may be fastened to the adjustable lap portion 250 by a buckle assembly 251. Any buckle assembly 251 may be used. In some instances, the buckle assembly 251 may include a release mechanism 253, such as a button or the like, configured to release the adjustable shoulder portion 248 and/or the adjustable lap portion 250 from about the child.

The restraint harness 246 may be constructed of materials, such as high tensile woven fabric, that meets or exceeds federal safety regulation requirements, such as Federal Motor Vehicle Safety Standards ("FMVSS") 209, 210, and/or 213, or Federal Aviation Administration ("FAA") regulations. Similarly, the at least one back member securing belt 234 and the at least one base member securing belt 240 may be constructed of similar materials. One will appreciate, however, that any material known in the art or otherwise may be used herein for any of the various components.

In certain embodiments, instead of or in addition to a buckle-type assembly 251 for fastening the adjustable shoulder portion 248 to the adjustable lap portion 250, the restraint harness 246 may include at least one attachment loop 252 for engaging the seat belt of an aircraft seat. That is, the adjustable shoulder portion 248, the adjustable lap portion 250, or a combination thereof may include one or more attachment loops 252 that the seat belt of the aircraft seat may be threaded through. In this manner, the at least one attachment loop 252 facilitates the integration of the aircraft's seat belt into the restraint harness 246, provides an additional coupling to the aircraft seat, and fastens the adjustable shoulder portion 248 to the adjustable lap portion 250. In some instances, however, the attachment loops 252 may be omitted.

The base member 206, the back member 216, or a combination thereof may include at least one attachment loop 254 for engaging a seat belt of an aircraft seat. That is, the base member 206 and/or the back member 216 may include one or more attachment loops 254 that a seat belt of an aircraft seat may be threaded through. In this manner, the at least one attachment loop 254 facilitates the integration of the aircraft's seat belt with the base member 206 and/or back member 216 and provides an additional coupling to an aircraft seat. For example, in certain aspects, the at least one attachment loop 254 may be disposed about the foldable junction 256 between the top surface 212 of the base member 206 and the front surface 222 of the back member 216. In one example, the child restraint device 200 may be secured to the aircraft seat via the seatbelt threaded through the at least one attachment loop 254, and the child may be secured to the child restraint device 200 by buckling the adjustable shoulder portion 248 to the adjustable lap portion 250 about the child.

In some instances, the base member 206 and/or the back member 216 may include an internal cavity for storing components of the child restrain device 200 therein, such as the restraint harness 246, the at least one back member securing belt 234, the at least one base member securing belt 240, and/or the shoulder strap 202. The internal cavity may include an opening at any point along the periphery or elsewhere of the base member 206 and/or the back member 216. The opening may include a fastening means, such as, for example, a zipper-type mechanism or the like as discussed above.

In one aspect, the base member 206 and/or the back member 216 may be between about 14 and 16 inches wide. In another aspect, the base member 206 and/or the back member 216 may be between about 0.25 and 2 inches thick. One will appreciate, however, that the various components of the child restrain device 200 may include any suitable dimension or configuration.

Figure 3:
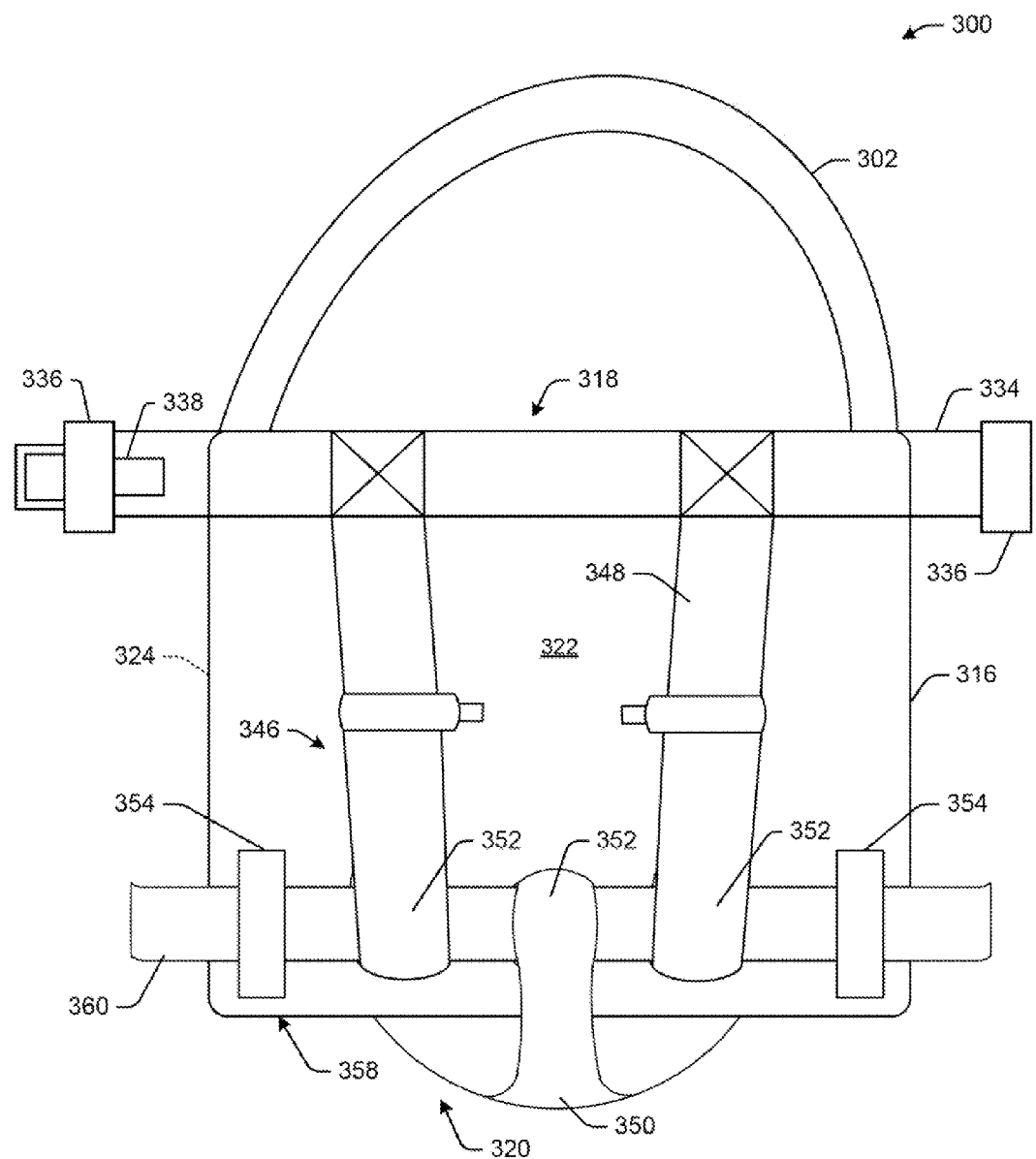
FIG. 3 schematically depicts a front view of an example embodiment of the child restraint device.
Figure 4:
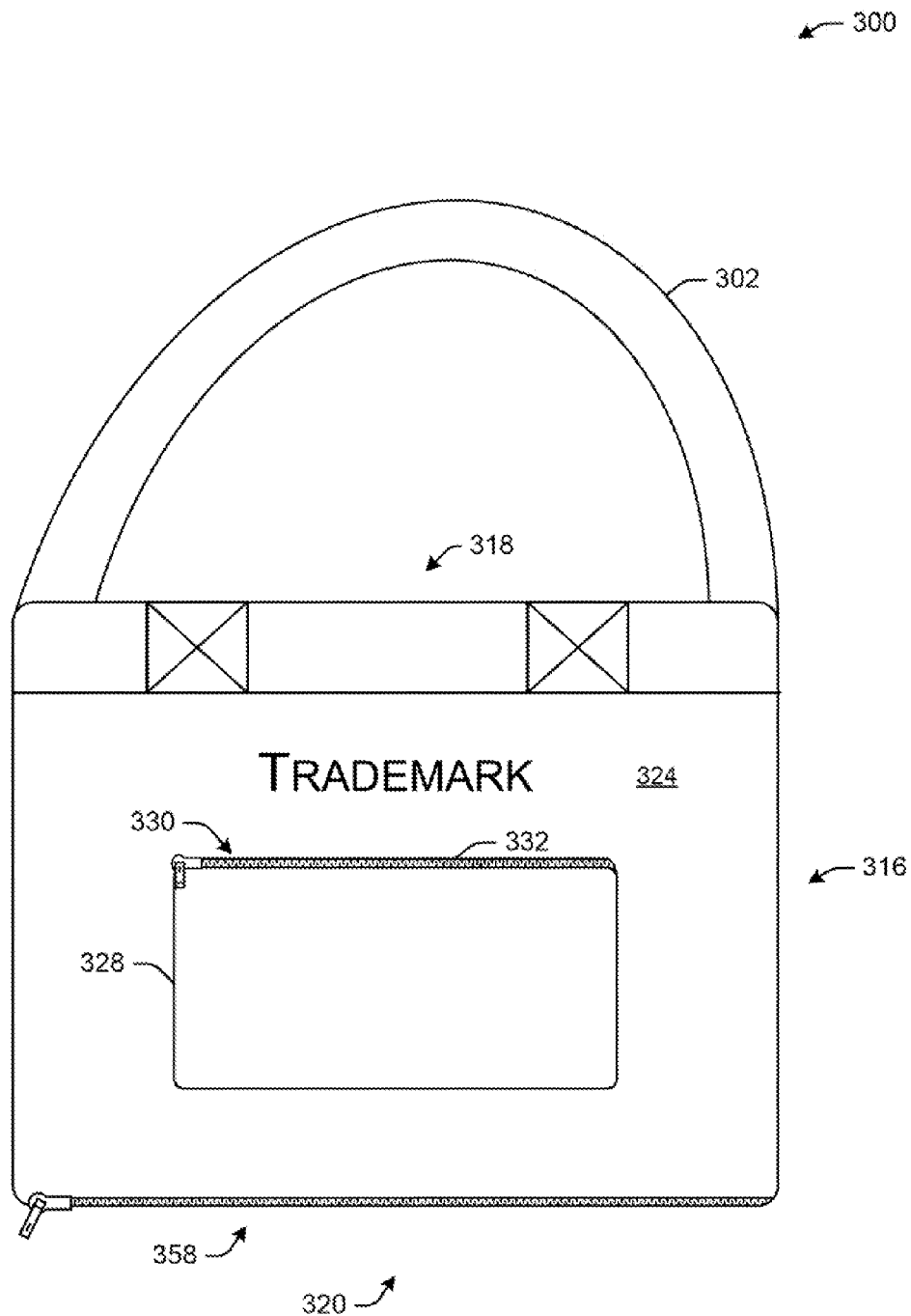
FIG. 4 schematically depicts a back view of an example embodiment of the child restraint device.
Figure 5:
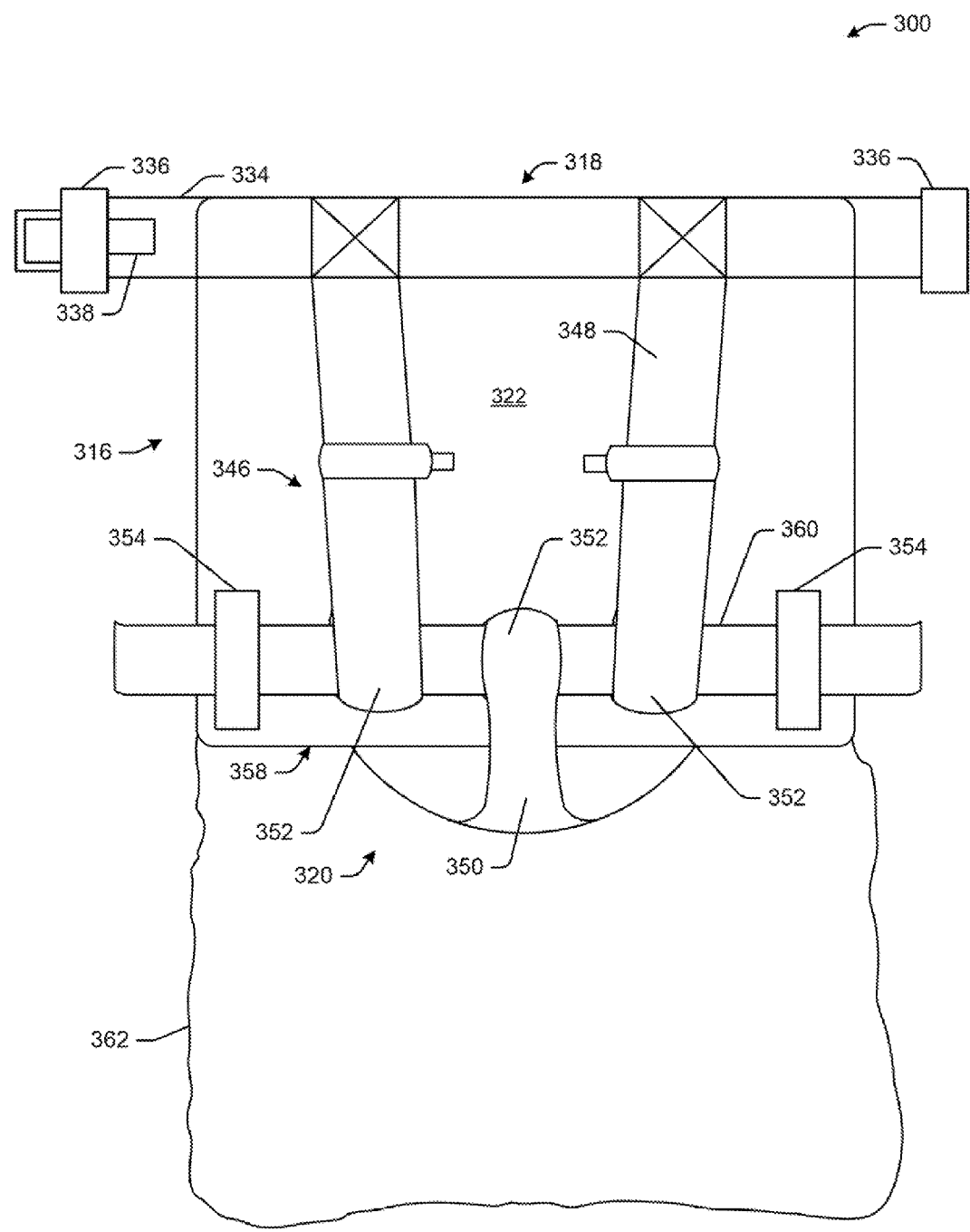
FIG. 5 schematically depicts a front view of an example embodiment of the child restraint device.

FIGS. 3-5 schematically depict an example embodiment of a child restraint device 300. In certain embodiments, the child restraint device 300 may include a back member 316 having a top end 318, a bottom end 320, a front surface 322, a rear surface 324, and an internal cavity 358. The child restraint device 300 may also include an adjustable shoulder strap 302 for carrying the child restraint device 300. This embodiment is similar to the embodiment discussed above with reference to FIGS. 1 and 2, except that this embodiment does not include a base member. Accordingly, there is no folded or unfolded configuration.

The child restraint device 300 may include at least one back member securing belt 334 that is attached to the back member 316 and is configured to be fastened around the back portion of the aircraft seat. In one aspect, the at least one back member securing belt 334 may include a configuration similar to a standard aircraft seat belt. For example, the at least one back member securing belt 334 may include a buckle 336 and an adjustable strap 338 for fastening the at least one back member securing belt 334 around the back portion of the aircraft seat. In some instances, the at least one back member securing belt 334 may include a hook-and-loop (e.g., VELCRO®) strap. The at least one back member securing belt 334 may extend in a generally transverse direction from the rear surface 324 of the back member 316 when fastened about the back portion of an aircraft seat. In another aspect, the at least one back member securing belt 334 may be attached to the back member 316 about the top end 318 of the back member 316, although the at least one back member securing belt 334 may be attached at any location about the back member 316.

The back member 316 may also include at least one attachment loop 354 for engaging the seat belt 360 of the aircraft seat. That is, the back member 316 may include one or more attachment loops 354 that the seat belt 360 of the aircraft seat may be threaded through. The at least one attachment loop 354 facilitates the integration of the seat belt 360 and the back member 316 and provides an additional coupling to the aircraft seat. The at least one attachment loop 354 may be positioned at any location about the back member 316.

In one aspect, the child restraint device 300 may include a storage pouch 328 positioned on the rear surface 324 of the back member 316, although the storage pouch 328 may be positioned at any location on the back member 316. The storage pouch 328 may include, for example, a mesh pouch comprising an opening 330 and a zipper 332. The storage pouch 328 may be similar to the storage pouch 128 described above with reference to FIGS. 1A and 1B.

Moreover, the child restraint device 300 may include a restraint harness 346 attached to the back member 316. The restraint harness 346 may be similar to the restrain harness 246 described in FIG. 2. For example, the restraint harness 346 may include an adjustable shoulder portion 348 attached to the top end 318 of the back member 316 and an adjustable lap portion 350 attached to the bottom end 320 of the back member 316. The adjustable shoulder portion 348 and the adjustable lap portion 350 may be releasably fastened together. The adjustable shoulder portion 348 of the restraint harness 346 may be configured to go over the shoulders of the child and secure the upper torso of the child. The adjustable lap portion 350 of the restraint harness 346 may be configured to go between the legs and over the lap of the child and secure the lower torso of the child. In certain aspects, the restraint harness 346 may include an adjustable five point restraint.

The restraint harness 346 may include at least one attachment loop 352 for engaging the seat belt 360 of the aircraft seat. That is, instead of or in addition to a buckle-type assembly for fastening the adjustable shoulder portion 348 to the adjustable lap portion 350, the restraint harness 346 may include at least one attachment loop 352 for engaging the seat belt 360 of an aircraft seat. That is, the adjustable shoulder portion 348, the adjustable lap portion 350, or a combination thereof may include one or more attachment loops 352 that the seat belt 360 of the aircraft seat may be threaded through. In this manner, the at least one attachment loop 352 facilitates the integration of the seat belt 360 into the restraint harness 346 and provides an additional coupling to the aircraft seat.

As mentioned above, the base member 316 may include an internal cavity 358 for storing components of the child restrain device 300, such as the restraint harness 346, the at least one back member securing belt 334, or the shoulder strap 302. The internal cavity 358 may include an opening at any point along the periphery of the back member 316. The opening may include a fastening means, such as, for example, a zipper-type mechanism. In one example, the internal cavity opening may be disposed along the periphery of the bottom end 320 of the back member 316.

In certain embodiments, a base cover 362 may be stowed within the internal cavity 358 of the back member 316. In other embodiments, the base cover 362 may be at least partially unstowed outside of the internal cavity 358 and positioned about the bottom member of the aircraft seat. Accordingly, the base cover 362 may provide a thin cover or base that the child may sit on.

Figure 6:
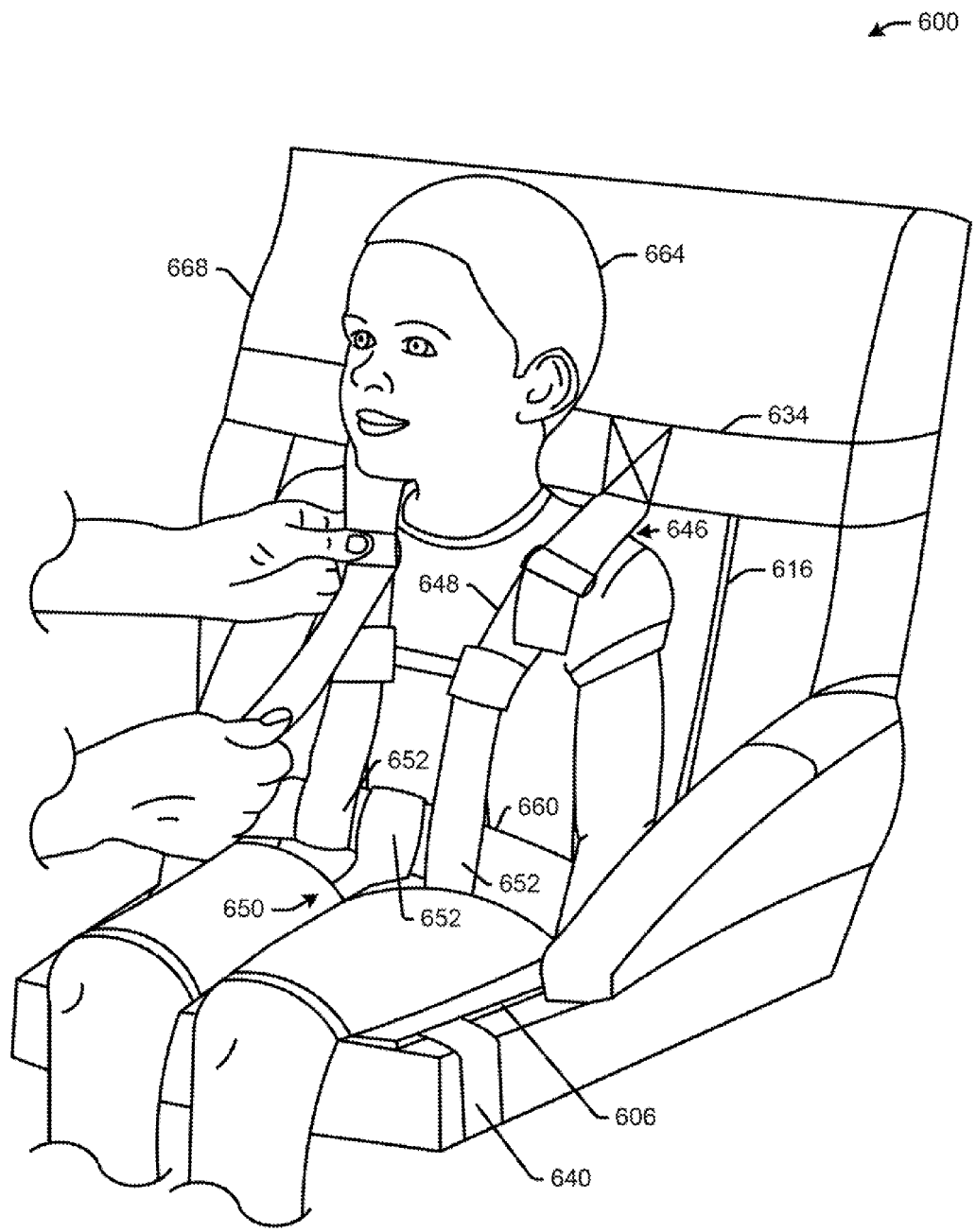
FIG. 6 schematically depicts a perspective view of an example embodiment of the child restraint device including a child seated therein.

FIG. 6 schematically depicts an example embodiment comprising a child 664 seated in a child restraint device 600, which is secured to an aircraft seat 668. The child restraint device 600 is similar to the child restraint device 200 discussed above. For example, the child restraint device 600 may include a base member 606 and a back member 616. The child restraint device 600 is positioned within the aircraft seat 668. The child restraint device 600 may include at least one back member securing belt 634 that is adapted to be fastened around the back portion of the aircraft seat 668. Similarly, the child restraint device 200 may include at least one base member securing belt 640 that is adapted to be fastened around the bottom portion of the aircraft seat 668.

The child restraint device 600 may also include a restraint harness 646. The restraint harness 646 may be used to secure the child 664 within the child restraint device 600. For example, the restraint harness 646 may include an adjustable shoulder portion 648 and an adjustable lap portion 650. In some instances, the adjustable shoulder portion 648 and the adjustable lap portion 650 may be releasably fastened together. The adjustable shoulder portion 648 may be configured to go over the shoulders of the child 664 and secure the upper torso of the child 664. The adjustable lap portion 650 may be configured to go between the legs and over the lap of the child 664 and secure the lower torso of the child 664. In some instances, the restraint harness 246 may comprise an adjustable five point restraint or the like. In certain embodiments, instead of or in addition to a buckle-type assembly for fastening the adjustable shoulder portion 648 to the adjustable lap portion 650, the restraint harness 646 may include at least one attachment loop 652 for engaging the seat belt 660 of the aircraft seat 668.

Although the foregoing description of the child restraint devices are described as being used with aircraft seats, the child restraint devices can be used with essentially any other type of seat on which it would be desirable to secure a child, including watercraft seats, land based vehicle seats, chairs in homes, chairs at restaurants, etc.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

I claim:

1. A child restraint device for use with a seat, the seat including a bottom portion, a back portion, and an associated seat belt assembly, the child restraint device comprising:
   a base member having a front end, a rear end, a top surface, and a bottom surface;
   a back member having a top end, a bottom end, a front surface, and a rear surface, the bottom end of the back member being foldably attached to the rear end of the base member such that the base member and the back member comprise a folded configuration and an unfolded configuration;
   at least one back member securing belt attached to the back member and configured to be fastened around the back portion of the seat;

at least one base member securing belt attached to the base member and configured to be fastened around the bottom portion of the seat;

at least one attachment loop disposed at a junction between the top surface of the base member and the front surface of the back member for engaging the seat belt, the attachment loop having one end attached to the top surface of the base member and a second end attached to the front surface of the back member; and a restraint harness disposed between the top surface of the base member and the front surface of the back member, wherein the restraint harness comprises:

an adjustable shoulder portion attached to the back member; and an adjustable lap portion attached to the base member, the adjustable shoulder portion and the adjustable lap portion being releasably fastened together.

2. The child restraint device of claim 1, wherein the restraint harness comprises at least one attachment loop for engaging the seat belt.

3. The child restraint device of claim 1, wherein the at least one back member securing belt and the at least one base member securing belt are adjustable.

4. The child restraint device of claim 1, wherein the at least one back member securing belt is attached about the top end of the back member, and wherein the at least one base member securing belt is attached about the front end of the base member.

5. The child restraint device of claim 1, further comprising means for securing the base member and the back member in the folded configuration.

6. The child restraint device of claim 5, wherein the means for securing the base member and the back member in the folded configuration comprises at least one of: a zipper-type mechanism, a strap, a button, or a latch.

7. The child restraint device of claim 1, further comprising a shoulder strap for carrying the child restraint device when in the folded configuration.

8. The child restraint device of claim 1, further comprising a storage pouch disposed on the rear surface of the back member.

9. The child restraint device of claim 1, wherein the base member or the back member comprises an internal cavity for storing at least one of: the restraint harness, the at least one back member securing belt, the at least one base member securing belt, or a shoulder strap.

* * * * *